July 6, 1943.  J. M. PITTS  2,323,352
CONTROL CABLE SYSTEM WITH IMPROVED COMPENSATING MEANS
Filed Oct. 16, 1941  2 Sheets-Sheet 2
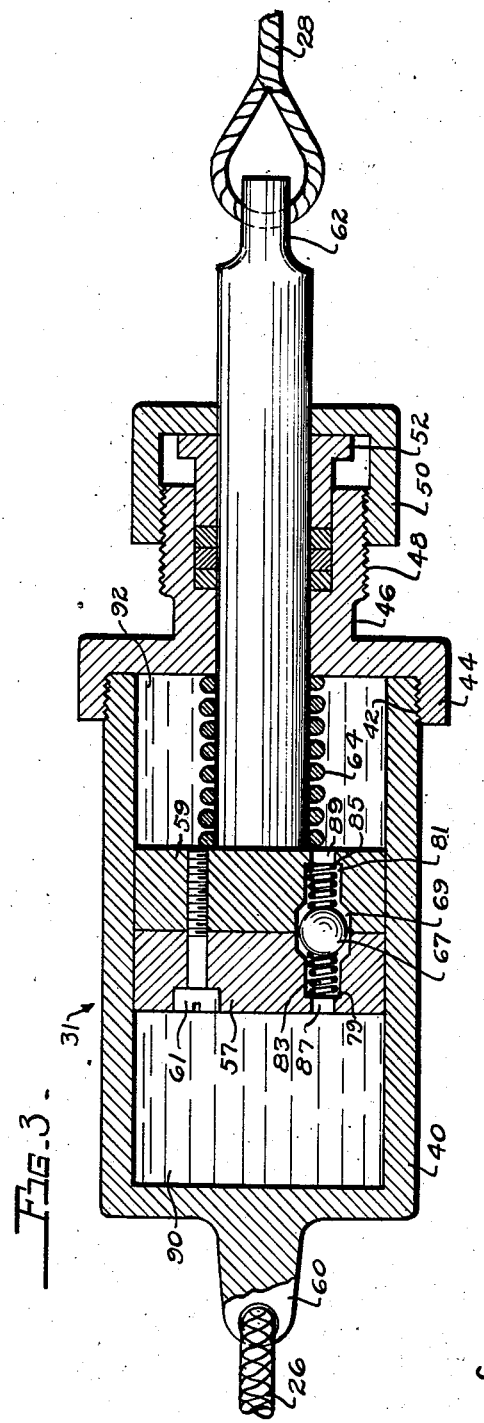
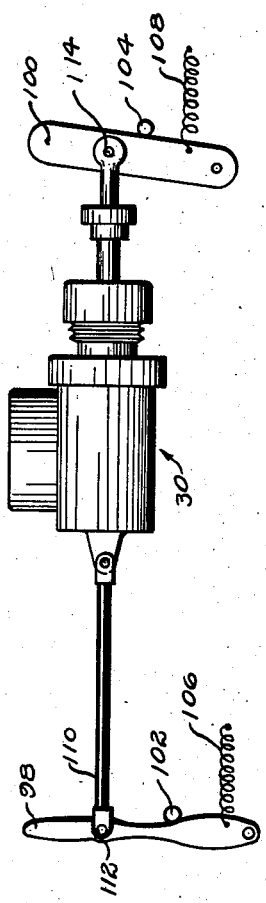
INVENTOR
JOSEPH M. PITTS Patented July 6, 1943

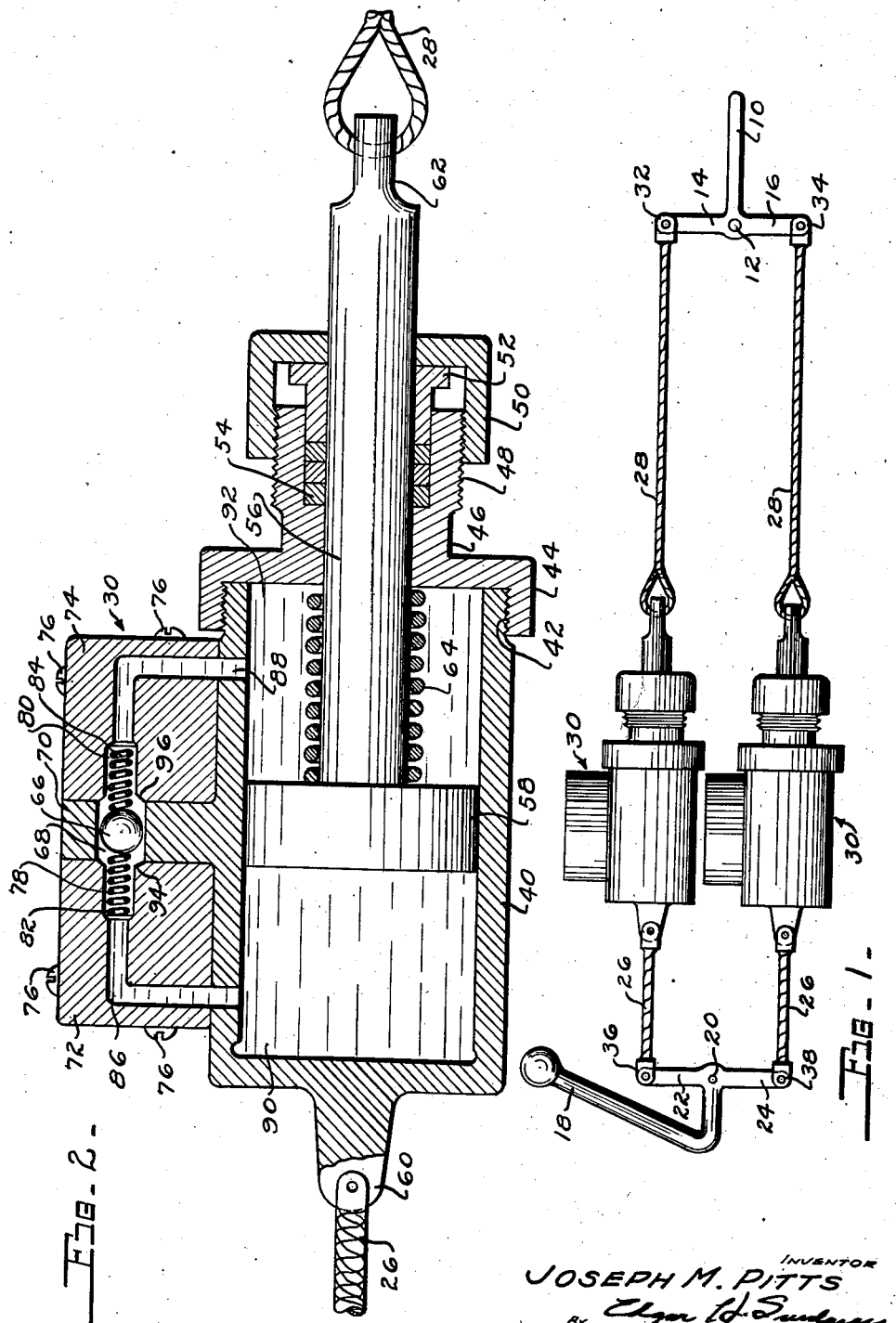

2,323,352

UNITED STATES PATENT OFFICE 2,323,352

CONTROL CABLE SYSTEM WITH IMPROVED COMPENSATING MEANS

Joseph M. Pitts, Dayton, Ohio

Application October 16, 1941, Serial No. 415,265

5 Claims. (Cl. 74—501)

(Granted under the act of March 3, 1883, as amended April 30, 1928; 370 O. G. 757)

The invention described herein may be manufactured and used by or for Government for governmental purposes, without the payment to me of any royalty thereon.

This invention relates to control cables and particularly to control cables on aircraft.

In the operation of the several control elements on aircraft, and particularly those more remote from the pilot, it is common practice to provide cables, usually in pairs, for each element, the arrangement being such that putting one or the other of a pair of cables in tension moves the element to which they attach in one or the other direction of operation.

Due to the necessity of designing for lightness, control cables are made to a minimum diameter consistent with safety, and are therefore subject to considerable stretching which necessitates adjustment of their lengths from time to time. Turnbuckles are usually provided for this purpose.

More recently, however, with the advent of high altitude flying, a more serious difficulty has developed, particularly where the fuselage may be made of aluminum, or other material having a high rate of expansion per unt of temperature change, and the cables of steel, for in that case the temperature drop from ground to maximum altitude may be sufficient to cause the fuselage to shrink considerably more than the cables, with the result that control cables, adjusted with turnbuckles to the desired tension on the ground, may sag to such an extent at maximum altitude as to make control difficult if not dangerous.

Innumerable devices have been proposed to meet this situation and patents have been granted on many of them, but so far as is known they all consist, in some form or other, of a spring, so placed in some part of the length of the cable as to keep in under constant tension. Such an arrangement will, of course, take up the cable when it sags for any reason and will accordingly compensate for changes in the relative length of the ship and cable due to altitude.

But the trouble with using a spring to automatically keep a cable under constant tension is that if the spring is made soft enough not to normally overstress the cable, it will yield upon application to the control lever of any considerable force, as, for instance, when bringing a ship hard about or when executing a sharp loop or zoom, or, when pulling the ship out of a power dive.

The inventors of the various resilient take up means for control cables substantially all point to the above characteristic as desirable, for, they say, if a great force is applied suddenly to the control lever, some part of the connecting means, between the lever and the control element should preferably yield at first then come back to normal gradually, so that a too rapid change of direction of the craft may not stress some of the elements to the breaking point.

Designers of modern aircraft, however, and of war craft in particular, do not share the view that it is preferable to have a yieldable element in the control cable, where such yieldable element causes any lag in the response of a control element to the force applied to the control lever, for in aerial combat, when it becomes necessary to execute a sharp change in direction, a lag in the response of the control element is more dangerous than a momentary overstressing of the control cable.

Turnbuckles are therefore almost universally used for taking the slack out of control cables, the turnbuckles being adjusted on the ground at predetermined intervals and to a predetermined tension, but while this treatment of the problem solves it as far as slack due to cable stretch is concerned, it does not furnish any means for taking up the slack due to temperature change at high altitude.

It is therefore an object of this invention to provide a control cable arrangement in which a relatively soft spring keeps the slack out of a control cable at all times whether such slack is occasioned by stretching of the cables or by temperature changes at high altitude, but since such a spring is not strong enough but that it may yield upon sudden application of considerable force upon the control lever, such as would be required in executing a quick change in direction, it is an additional object to provide means which will, upon application of such considerable force, lock the device in the position to which the spring had previously adjusted it making it unyielding as would be the case had a turnbuckle been used for the adjustment.

Other objects and advantages will become evident from a consideration of the following description when taken in conjunction with the drawings, wherein Figure 1 is a side elevation showing, more or less schematically, an assembly of a control unit comprising an elevator, a control lever, the cables, and a compensator for each cable.

Figure 2 is an axial section through one of the compensators.

Figure 3 shows a compensator of modified form.

Figure 4 shows a modified application of the invention in which a single compensator is employed.

Like numerals refer to like parts throughout the drawings.

Referring more particularly to Figure 1, an elevator 10 is hinged in the usual manner at 12 and has operating arms 14 and 16 extending oppositely from the hinge point. A control lever 18 is hinged at 20 and has operating arms 22 and 24 extending oppositely from its hinge point.

Control cables each comprising cable parts 26 and 28 connected by a compensator 30 are hinged to the outer ends of the arms 14, 16, 22 and 24 as at 32, 34, 36 and 38, whereby rocking of the control lever 18 about the hinge 20 rocks the elevator 10 about its hinge 12.

Referring more particularly to Figure 2, the compensator 30 comprises a cylinder 40 threaded at 42 for the end cap 44. A hub 46 extends from the end cap and is externally threaded at 48 for the packing nut 50 which bears against a packing gland 52 to compress the packing 54 around the rod 56 of the piston 58 which is axially slidable in the cylinder 40. The cable parts 26, 28 are joined to lugs 60, 62 on the ends of cylinder 40 and piston rod 56 respectively. A medium spring 64 urges the piston 58 toward the left, as seen in Figure 2, with a force just sufficient to keep the cables taut. Such a spring is, of course, not stiff enough to resist being compressed upon sudden application of a considerable force to the control lever 18 as is required in making a quick change in direction.

In order to prevent the spring 64 from yielding to compression upon application of a heavy force to the control lever 18, there is provided a valve means which freezes the piston in whatever position it may happen to have been adjusted by the spring 64 at the time the heavy force is applied.

This valve means consists of a ball 66 freely slidable in an opening 68 in a rib 70 which is preferably, although not necessarily, integral with the cylinder 40. Cover members 72 and 74 are secured pressure tight to the faces of rib 70 by screws 76 and contain openings 78 and 80 for the light springs 82 and 84, while smaller passages 86 and 88 connect the openings 78 and 80 to the spaces 90 and 92 inside the cylinder 40. The opening 68 should be several one thousandths of an inch larger than the ball 66, and the springs 82 and 84 should preferably be identical in length and strength. The inner ends of openings 78, 80 may be slightly beveled as at 94 and 96 to provide valve seats for the ball 66. The lengths of the cable parts 26, 28 should be such that when on the ground and at average temperature the piston 58 will be near midway in the cylinder space as shown. The entire space within the cylinder and the valve passages should be filled with a hydraulic fluid.

In the compensator shown in Figure 3, substantially the same effect is had as with that shown in Figure 2, the only difference being in the passageway which connects the end spaces 90 and 92 of the cylinder through the piston instead of around it. The ball 67, ball opening 69, spring openings 79 and 81 for the light springs 83 and 85, and smaller openings 87 and 89 may be of the same diameter in the modified compensator 31 as in the preferred form 30. The pistons, however, are slightly different, that in the modification 31 being made in two parts 57 and 59 held together by screws 61.

In the modification shown in Figure 4 an operating lever 98 and an operated arm 100 are held against stops 102 and 104 by light springs 106 and 108. A connecting rod of considerable length 110, together with a compensator 30, join the levers. The compensator maintains automatic adjustment of the length of the rod 110, to agree with the distance between its hinge points 112 and 114 which points may, of course, also vary from one minute to the next due to temperature changes.

The control system operates as follows:

Assume that an airplane equipped with the improved control cable system is on the ground and that the piston 58 is positioned in the cylinder 40 substantially as shown in Figure 2. If the plane now climbs, for illustration, to its maximum altitude, the slack in the cables (see Figure 1) due to temperature change will allow the spring 64 to move the piston 58 to the left and take up the slack, the amount of movement being dependent of course upon the amount of the temperature change.

In order to move to the left, the piston 58 must necessarily force a quantity of the hydraulic fluid from the space 90 through passages 86 and 78, through the small clearance between the ball 66 and its opening 68, through passages 80 and 88 into the space 92.

Now since the clearance between the ball 66 and its opening 68 is very small, considerable time is required for the displaced fluid to pass from the space 90 to the space 92, but it also takes considerable time for the plane to climb to its maximum altitude, therefore the necessary volume of fluid will pass through the clearance space around the ball without disturbing its position in its opening 68. The clearance around the ball 66 is in fact such that the most rapid temperature changes that may occur in the plane and its cables will not shift more fluid from space 90 to 92 than may pass the ball 66 without moving it and compressing the light spring 84. The heavier spring 64 is therefore free to expand at the slow rate required to take up cable slack due to temperature changes as well as slack due to cable stretch.

If now, while the cable is thus tautened, a necessity arises for applying a sudden heavy pressure to the control lever 18 to execute a quick change in direction, such application will, upon an almost imperceptible movement of the piston 58 to the right, cause the ball 66 to compress the light spring 82 and seat itself against the seat 94, whereupon the piston 58 is frozen in its position in the cylinder 40 and the compensator becomes a rigid member equal in effectiveness to a turnbuckle.

It will, therefore, be seen that, in the arrangement shown and described, the effect is that of a spring take up for slack which is due to stretch and temperature change while the effect is that of a turnbuckle for resisting cable elongation during the application of heavy pressure to the control lever.

In the modification Figure 4, the spring 108 should preferably be stronger than the spring 64 in the compensator so that the lever 100 may always maintain its position against the stop 104.

In other respects the action is the same as heretofore explained relative to Figure 1.

Having thus described several variants of the invention, I claim:

1. An apparatus having an operable member, a spaced apart operating member, and connecting means operatively joining said members, said connecting means including a device for compensating for lengthening or shortening of the other portions of the connecting means, said device comprising in combination, a piston, a fluid filled cylinder closed around said piston, said piston being slidable in said cylinder, means for connecting said piston and cylinder to the other portions of said connecting means, there being a passageway connecting the spaces in said cylinder which are separated by said piston, and means for locking said piston in situ in said cylinder, said locking means comprising a valve in said passageway which is normally sufficiently open to allow slow seepage of fluid from one end of the cylinder to the other, but is operative to be tightly closed by any rapid movement of fluid therethrough.

2. An apparatus having spaced apart operable and operating members with a connecting means operatively joining said members, said connecting means including a device for compensating for expansion or contraction of the other portions of said connecting means, said device comprising in combination, a piston, a fluid filled cylinder closed around said piston, said piston being slidable in said cylinder, means for joining piston and said cylinder to the other portions of said connecting means, there being a passageway connecting the spaces in said cylinder which are separated by said piston, and means for locking said piston in any position against movement in said cylinder, said locking means including a valve in said passageway, a light spring holding said valve in an open position, said valve when open being adapted to allow slow seepage only of fluid from one end of said cylinder to the other, but adapted to be fully closed against the resistance of said light spring when any considerable volume of fluid attempts to flow through said valve.

3. The combination, in a remote controlled apparatus, of a controlling member, a spaced apart controlled member, means operatively connecting said members, an adjusting device included in said connecting means, said adjusting device comprising a piston, a fluid filled cylinder closing around said piston, spring means adapted to urge said piston axially in said cylinder, there being a passageway connecting the spaces in the cylinder which are separated by said piston, a valve in said passageway, a second spring means normally biasing said valve to a position which is sufficiently open to allow the fluid to seep through as the connecting means expands or contracts, but adapted to be closed against the resistance of said second spring means by any rapid movement of said piston.

4. In a device having spaced apart operable members joined by a connecting means, a compensator in the connecting means for automatically adjusting for expansion and contraction in said connecting means, said compensator comprising, in combination, a fluid filled cylinder closed at the ends, a piston slidable axially in said cylinder, a piston rod extending from said piston through one end of said cylinder, means on the outer end of said rod and at the opposite end on said cylinder for attachment in said connecting means, a resilient means urging the piston away from the end from which the piston rod emerges, there being a passageway connecting the ends of the cylinder which are separated by the piston, a double check valve in said passageway biased to an open position whereby it will permit slight seepage of fluid from either end of the cylinder to the other, but adapted to be closed tightly by movement of any considerable fluid from either end of the cylinder to the other, whereby rapid operation of said operable members locks said piston against endwise movement in said cylinder.

5. The structure of claim 4 wherein the double check valve comprises a ball freely slidable in an opening comprising an enlarged section of said passageway said opening being of sufficient length to permit some endwise movement of said ball, smaller openings at each end of said ball openings having seats for said ball at their ends which join the ball opening, light springs under an initial stress for holding said ball midway in the length of the ball opening, and still smaller openings extending from the spring openings to the spaces within the cylinder separated by the piston.

JOSEPH M. PITTS.